United States Patent
Steinke et al.

(10) Patent No.: US 9,353,232 B2
(45) Date of Patent: *May 31, 2016

(54) MELAMINE-FORMALDEHYDE FOAMS COMPRISING HOLLOW MICROSPHERES

(75) Inventors: Tobias Heinz Steinke, Speyer (DE); Peter Nessel, Ludwigshafen (DE); Klaus Hahn, Kirchheim (DE); Horst Baumgartl, Ludwigshafen (DE); Christof Möck, Mannheim (DE); Bernhard Vath, Mannheim (DE); Bettina Wester, Maxdorf (DE); Jens-Uwe Schierholz, Bensheim (DE); Dave Pung, Loveland, OH (US)

(73) Assignee: BASF SE, Ludwigshafen (DE)

( * ) Notice: Subject to any disclaimer, the term of this patent is extended or adjusted under 35 U.S.C. 154(b) by 703 days.

This patent is subject to a terminal disclaimer.

(21) Appl. No.: 13/471,557

(22) Filed: May 15, 2012

(65) Prior Publication Data

US 2012/0292552 A1 Nov. 22, 2012

Related U.S. Application Data

(60) Provisional application No. 61/486,338, filed on May 16, 2011.

(51) Int. Cl.
| | | |
|---|---|---|
| *C08J 9/32* | (2006.01) | |
| *C08J 9/00* | (2006.01) | |
| *C08J 9/14* | (2006.01) | |
| *E04B 1/74* | (2006.01) | |
| *C08L 61/28* | (2006.01) | |
| *F28D 20/02* | (2006.01) | |

(52) U.S. Cl.
CPC ............... *C08J 9/0066* (2013.01); *C08J 9/141* (2013.01); *C08J 9/32* (2013.01); *C08J 2205/05* (2013.01); *C08J 2361/28* (2013.01); *C08L 61/28* (2013.01); *E04B 2001/742* (2013.01); *F28D 20/023* (2013.01)

(58) Field of Classification Search
CPC .. C08J 2205/05; C08J 2361/28; C08J 9/0066; C08J 9/32; C08L 61/28; C08G 12/32
See application file for complete search history.

(56) References Cited

U.S. PATENT DOCUMENTS

| | | | | |
|---|---|---|---|---|
| 4,107,134 A | * | 8/1978 | Dawans | 523/220 |
| 4,334,971 A | | 6/1982 | Mahnke et al. | |
| 4,511,678 A | | 4/1985 | Mahnke et al. | |
| 4,666,948 A | | 5/1987 | Woerner et al. | |
| 6,200,681 B1 | | 3/2001 | Jahns et al. | |
| 6,476,087 B1 | * | 11/2002 | De Toffol | 521/54 |
| 6,608,118 B2 | | 8/2003 | Kosaka et al. | |
| 8,629,196 B2 | * | 1/2014 | Pung et al. | 521/187 |
| 2004/0234738 A1 | | 11/2004 | Jahns et al. | |
| 2005/0049321 A1 | | 3/2005 | Baumgartl et al. | |
| 2008/0033075 A1 | | 2/2008 | Schmidt et al. | |
| 2008/0263794 A1 | * | 10/2008 | Sivik et al. | 15/104.002 |
| 2008/0300329 A1 | * | 12/2008 | Fechtenkotter et al. | 521/65 |
| 2010/0068525 A1 | | 3/2010 | Jung et al. | |
| 2011/0124754 A1 | | 5/2011 | Alteheld et al. | |

FOREIGN PATENT DOCUMENTS

| | | | |
|---|---|---|---|
| CA | 1151350 A1 | | 8/1983 |
| CA | 1166798 A1 | | 5/1984 |
| DE | 101 39 171 A1 | | 2/2003 |
| DE | 10 2007 055 813 A1 | | 6/2008 |
| EP | 17 671 A1 | | 10/1980 |
| EP | 17 672 A1 | | 10/1980 |
| EP | 37 470 A1 | | 10/1981 |
| EP | 111 860 A2 | | 6/1984 |
| EP | 0 451 535 A1 | | 10/1991 |
| EP | 1 029 018 A1 | | 8/2000 |
| EP | 1 505 105 A1 | | 2/2005 |
| EP | 09176634.5 | | 5/2011 |
| EP | 10152499.9 | | 8/2011 |
| WO | WO 02/31032 | * | 4/2002 |
| WO | WO-2005/116559 A1 | | 12/2005 |
| WO | WO-2007/031944 A2 | | 3/2007 |
| WO | WO-2008071649 A2 | | 6/2008 |
| WO | WO-2009/021963 A1 | | 2/2009 |

* cited by examiner

*Primary Examiner* — John Cooney
(74) *Attorney, Agent, or Firm* — Drinker Biddle & Reath LLP

(57) ABSTRACT

The present invention relates to melamine-formaldehyde foams comprising hollow microspheres wherein said hollow microspheres have a median particle diameter ($D_{50}$, volume averaged, Malvern, Fraunhofer diffraction) in the range from 260 μm to 490 μm, and also processes for producing these melamine-formaldehyde foams and their uses.

12 Claims, No Drawings

MELAMINE-FORMALDEHYDE FOAMS COMPRISING HOLLOW MICROSPHERES

CROSS-REFERENCE TO RELATED APPLICATIONS

This application claims benefit (under 35 USC 119(e)) of U.S. Provisional Application 61/486,338, filed May 16, 2011, which is incorporated by reference.

This patent application is subject to a joint research agreement entered into between BASF SE and The Procter & Gamble Company.

The present invention relates to melamine-formaldehyde foams comprising hollow microspheres.

EP-A-17 672 and EP-37 470 already disclose foams based on melamine-formaldehyde condensation products and also a process for production thereof.

It is also known to endow such foams with hollow microspheres. The hollow microspheres may contain active or effective substances, for example substances that act as latent heat storage media and so improve the thermal insulation properties of the melamine-formaldehyde foams, or else scents or biocidally active substances, which are released on destruction of the hollow microsphere walls to develop their specific effect for the particular desired purpose. It is similarly possible to hydrophobicize the foam structure by encapsulation and subsequent release of hydrophobic substances, for example silicone oils.

European patent application EP 10152499.9 (file reference) describes for example melamine-formaldehyde foams comprising microcapsules having a median particle diameter of 0.5-100 μm. These microcapsules are preferably incorporated into the nodal points or struts of the foam structure.

European patent application EP 09176634.5 (file reference) describes melamine-formaldehyde foams comprising expanded hollow microspheres having a median particle diameter of 70-250 μm. The hollow microspheres are preferably incorporated into the pores of the foam structure. Incorporation into the pores is achieved by a multi-stage production process wherein the melamine-formaldehyde foam is produced in a first step and the hollow microspheres are introduced into the foam in a second additional impregnating step.

However, incorporation into the nodal points or struts of the foam structure can be associated, particularly at high loadings with hollow microspheres, with an impairment of the foaming operation and/or of the mechanical properties of the foam. Subsequent impregnation of the foam is an additionally necessary process step and, on the other hand, introducing and fixing the hollow microspheres to the foam is difficult with increasing loading.

The problem addressed by the present invention is accordingly that of providing a melamine-formaldehyde foam endowed with hollow microspheres which substantially retains good mechanical foam properties even at high loadings, i.e., hollow microsphere contents and any associated active and effect substance contents, provides better fixation of the hollow microspheres in the foam, and is obtainable in simple processes without additional production step.

We have found that this problem is solved by novel melamine-formaldehyde foams comprising hollow microspheres wherein said hollow microspheres have a median particle diameter ($D_{50}$, volume averaged, Malvern, Fraunhofer diffraction) in the range from 260 μm to 490 μm. Processes for producing these melamine-formaldehyde foams and uses thereof have also been found.

The melamine-formaldehyde foams of the present invention have good mechanical foam properties and better fixation of the hollow microspheres in the foam particularly at high loadings, i.e., hollow microsphere contents and any associated active and effect substance contents. Furthermore, the hollow microspheres can be incorporated in the foam in the course of foam production without additional process step.

The articles, processes and uses according to the present invention will now be described.

Melamine-formaldehyde foams as such and their production and also hollow microspheres as such and their production are known to a person skilled in the art and described in the literature (see for example the references mentioned at the beginning).

The melamine-formaldehyde foams of the present invention comprise hollow microspheres and these hollow microspheres in accordance with an essential requirement have a median particle diameter ($D_{50}$, volume averaged, Malvern, Fraunhofer diffraction) in the range from 260 μm to 490 μm, preferably in the range from 280 μm to 450 μm and more preferably in the range from 300 μm to 400 μm.

The hollow microsphere content is generally in the range from 0.1% to 60% by weight, preferably in the range from 5% to 50% by weight and more preferably in the range from 10% to 30% by weight, the weight all being based on the total weight of hollow microspheres and melamine-formaldehyde precondensate used for foam production.

The melamine-formaldehyde foams have an open-cell foam scaffold comprising a multiplicity of interconnected, three-dimensionally branched struts (the points of connection between the struts being known as "nodes" or "nodal points"). The hollow microsphere median particle diameter which is essential to the present invention and the hereinbelow described production process for the melamine-formaldehyde foams of the present invention cause the hollow microspheres to become preferentially embedded into the open-cell pores of the foam structure. Incorporation into the struts or nodes of the foam scaffold does not take place to any significant extent, if at all. As a result, good fixation of the hollow microspheres in the foam is achieved even at high hollow microsphere contents without the mechanical properties of the foam becoming excessively affected.

The present invention melamine-formaldehyde foams comprising hollow microspheres are preferably obtainable by the consecutive process steps a) and b):

a) heating to foam up and crosslink a mixture comprising a melamine-formaldehyde precondensate having a molar ratio of melamine:formaldehyde in the range of typically from 1:1.3 to 1:5 and preferably from 1:1.5 to 1:3.5, the hollow microspheres, a curative, a dispersant and a blowing agent, and b) drying the foam obtained in process step a), wherein these process steps and also the melamine-formaldehyde precondensates, curatives, dispersants and blowing agents useful in step a) are known in principle to a person skilled in the art and are described in the literature (see for example the references cited at the beginning).

The melamine-formaldehyde precondensate in addition to melamine and formaldehyde may comprise up to 50% by weight and preferably up to 20% by weight (all based on the weight of cocondensed melamine) of other thermoset-formers and up to 50% by weight and preferably up to 20% by weight (all based on the weight of cocondensed formaldehyde) of other aldehydes in cocondensed form. Useful thermoset-formers include for example: alkyl- and aryl-alkyl-substituted melamine, urea, urethanes, carboxamides, dicyandiamide, guanidine, sulfurylamide, sulfonamides, aliphatic amines, glycols, phenol and its derivatives. Examples of useful other aldehydes are acetaldehyde, trimethylolacetaldehyde, acrolein, benzaldehyde, furfurol, glyoxal, glutaraldehyde, phthalaldehyde and terephthalaldehyde. Particular preference is given to an unmodified melamine-formaldehyde precondensate, i.e., a melamine-formaldehyde precondensate devoid of any other thermoset-formers or other aldehydes. Further details concerning melamine-formaldehyde condensation products may be found in Houben-Weyl, Methoden der organischen Chemie, volume 14/2, 1963, pages 319 to 402.

Commercially available melamine-formaldehyde precondensates are useful for a multiplicity of fields of use, for example for further processing into glues. Melamine formaldehyde precondensates comprising sulfite groups are advantageous for use in some of these fields. Such sulfite group-containing melamine-formaldehyde precondensates are obtainable for example as described in EP-B 37470 whereby from 1% to 20% by weight of sodium disulfite is incorporated in the course of the condensation of melamine and formaldehyde to obtain cocondensed sulfite groups. For the processes of the present invention, however, it is advantageous that step a) utilizes a precondensate which is free of the sulfite groups.

Emulsification of the blowing agent and stabilization of the foam in step a) requires the addition of a dispersant, e.g., an emulsifier or emulsifier mixture. Useful emulsifiers include anionic, cationic and nonionic surfactants and also mixtures thereof.

Suitable anionic surfactants are diphenylene oxide sulfonates, alkane- and alkylbenzenesulfonates, alkylnaphthalenesulfonates, olefinsulfonates, alkyl ether sulfonates, fatty alcohol sulfates, ether sulfates, alpha-sulfo fatty acid esters, acylaminoalkanesulfonates, acyl isethionates, alkyl ether carboxylates, N-acylsarcosinates, alkyl and alkyl ether phosphates. Useful nonionic surfactants include alkylphenol polyglycol ethers, fatty alcohol polyglycol ethers, fatty acid polyglycol ethers, fatty acid alkanolamides, EO-PO block copolymers, amine oxides, glycerol fatty acid esters, sorbitan esters and alkylpolyglucosides. Useful cationic emulsifiers include alkyltriammonium salts, alkylbenzyldimethylammonium salts and alkylpyridinium salts. The emulsifiers are preferably added in amounts of 0.2% to 5% by weight, based on the melamine-formaldehyde precondensate.

For the melamine-formaldehyde precondensate, which is preferably used in the form of an aqueous solution or dispersion, to produce a foam in step a), it has to comprise a blowing agent, the amount depending on the desired density of the foam. In principle, the process of the present invention can utilize both physical blowing agents and chemical blowing agents. Useful physical blowing agents include, for example, hydrocarbons, halogenated and more particularly fluorinated hydrocarbons, alcohols, ethers, ketones and esters in liquid form or air and $CO_2$ as gases. Useful chemical blowing agents include, for example, isocyanates mixed with water, in which case $CO_2$ is released as an effective blowing agent, moreover carbonates and bicarbonates mixed with acids, which likewise produce $CO_2$, and also azo compounds, such as azodicarbonamide. In one preferred embodiment of the present invention, the aqueous solution or dispersion of the melamine-formaldehyde precondensate is admixed with between 1% and 40% by weight, based on the melamine-formaldehyde precondensate, of a physical blowing agent having a boiling point of between 0 and 80° C.; in the case of pentane, the amount used is preferably in the range from 5% to 15% by weight.

Curatives used in step a) comprise acidic compounds catalyzing the continued condensation of the melamine-formaldehyde precondensate. The amounts are between 0.01% and 20% by weight and preferably between 0.05% and 5% by weight, based on the melamine-formaldehyde precondensate. Organic and inorganic acids can be used, examples being hydrochloric acid, sulfuric acid, phosphoric acid, nitric acid, formic acid, acetic acid, oxalic acid, toluenesulfonic acids, amidosulfonic acids and also acid anhydrides.

The aqueous solution or dispersion of the melamine-formaldehyde precondensate used in step a) is preferably free of further added substances. However, it can be beneficial for some purposes to add up to 20% by weight, and preferably less than 10% by weight, based on the melamine-formaldehyde precondensate, of customary added substances, such as dyes, flame retardants, UV stabilizers, agents to lower combustion gas toxicity or to promote carbonization. Since the foams are generally open celled and capable of imbibing water, some applications make it necessary to add hydrophobicizers in amounts of 0.2% to 5% by weight. Useful hydrophobicizers include for example silicones, paraffins, silicone surfactants, fluorosurfactants, hydrophobic hydrocarbonaceous surfactants, silicone emulsions and fluorocarbon emulsions.

The concentration of the melamine-formaldehyde precondensate in the mixture of precondensate and solvent/dispersant, more particularly water, can vary within wide limits between 55% and 85% by weight and preferably between 63% and 80% by weight, all based on the total weight of melamine-formaldehyde precondensate and solvent/dispersant. The preferred viscosity of the mixture of precondensate and solvent/dispersant is between 1 and 3000 dPa.s and preferably between 5 and 2000 dPa.s.

The hollow microspheres and further mixture components are mixed with the aqueous solution or dispersion of the melamine-formaldehyde precondensate to form a homogeneous mixture, with the blowing agent being forced in under pressure if necessary. However, it is also possible to start with a solid, for example spray-dried, melamine-formaldehyde precondensate and to subsequently mix it with a dispersion of the hollow microspheres and/or with an aqueous solution of the emulsifier, with the curative and also with the blowing agent. After mixing, the heated resin mixture with the dispersed blowing agent is discharged through a die and foams up thereafter.

Foaming of the blowing agent-containing solution or dispersion upon emergence from the die is augmented—as described in EP-B 17671—by means of hot air or high frequency irradiation. Preferably, the energy can be input by electromagnetic radiation, for example by high frequency irradiation with 5 to 400 kW, preferably 5 to 200 kW, particularly preferably 9 to 120 kW per one kilogram of the mixture used in a frequency range of 0.2 to 100 GHz, preferably 0.5 to 10 GHz. Magnetrons are a suitable source of radiation for dielectric radiation, with one or more magnetrons being able to be irradiated at the same time.

The mixture to be foamed is irradiated immediately on emerging from the foaming die. The blowing agent evaporates, the resin mixture foams up and at the same time cures through.

The foams produced are finally dried to remove water and blowing agent remaining in the foam.

In a further embodiment of the process according to the present invention, process step b) may be followed by a process step c) in which the dried foam is press molded to make it elastic.

Process step c) is known in principle to a person skilled in the art and is described in the literature, for example in EP-A 1 505 105 and EP-B 37470.

The foam blocks or sheets obtained can optionally be thermocompressed in a further process step. Thermocompression as such is known to a person skilled in the art and described for example in WO 2007/031944, EP-A 451 535, EP-A 111 860 and U.S. Pat. No. 6,608,118. Thermocompression can often provide better fixation of the hollow microspheres in the foam structure.

Preferred hollow microspheres for producing the melamine-formaldehyde foams of the present invention have walls consisting of a polymer, an inorganic material or a combination of inorganic material and polymer (by adhering inorganic materials for example).

Polymers suitable for the hollow microsphere walls are preferably polyurethane, melamine-formaldehyde resin, epoxy resin, polyester, polycarbonate, polyacrylates, polyamides or mixtures thereof.

Inorganic materials useful as hollow microsphere walls are preferably silicates, particularly those of aluminum, of calcium, of magnesium and/or of zirconium, oxides such as aluminum oxide, quartz, magnesite, mullite, chromite, zirconium oxide and/or titanium oxide, borides, carbides and nitrides such as silicon carbide, titanium carbide, titanium boride, boron nitride and/or boron carbide, carbon or glass and more preferably glass.

The hollow microsphere interiors may contain a gas, for example air, or alternatively be evacuated. Preferably, the hollow microsphere interiors are at least partly and more particularly fully filled with one or more solid or liquid active or effect substance. Active or effect substances are for example substances which act as latent heat storage media and hence are capable of improving the thermal insulation properties of the melamine-formaldehyde foams, or else surfactants, detergents or dyes, for example inks, scents or biocidally acting substances which are released by destruction of the hollow microsphere walls to develop their specific activity for the particular desired use. Further usable active or effect substance known per se to a person skilled in the art are for example hydrophobicizing agents; substances influencing haptics or the soil release behavior (to obtain the so-called lotus effect for example); substances reducing smoke gas toxicity; formaldehyde scavengers; intumescents; abrasives such as inorganic nanoparticles for example (see WO 2009/021963 for example); or catalysts.

Preferred hollow microspheres comprising wall material based on a highly crosslinked methacrylic ester polymer are known from EP-A-1 029 018, DE-A-101 39 171 and WO-A-2005/116559. They all relate to microencapsulated latent heat storage materials in different fields of use. EP-A-1 029 018 teaches the use in bindered building materials such as concrete or gypsum, DE-A-101 39 171 teaches the use of microencapsulated latent heat storage materials in gypsumboard, and WO-A-2005/116559 teaches their use in chipboard. The hollow microspheres described in these references all are said to have high imperviousness in thermal treatment, chemical treatment and under pressure.

Hollow microspheres are obtainable via a so-called in situ polymerization for example. The basis for the principle of hollow microsphere formation is that the monomers, a free-radical initiator, a protective colloid and the lipophilic substance to be encapsulated are combined to form a stable oil-in-water emulsion. Then, the polymerization of the monomers is started by heating and optionally controlled via further temperature elevation, the resulting polymers forming the hollow sphere wall which encloses the lipophilic substance. This general principle is described for example in DE-A-10 2007 055 813, WO2008071649 and DE-A-101 39 171, the content of which is hereby expressly incorporated herein by reference.

DE-A-10 2007 055 813 describes the production and use of thermally destructible hollow microspheres, which are likewise preferred. The hollow microsphere wall is constructed of acrylates. The hollow microsphere interior contains lipophilic substances, such as aliphatic and aromatic hydrocarbon compounds, saturated or unsaturated $C_6$-$C_{30}$ fatty acids, fatty alcohols, $C_5$-$C_{30}$ fatty amines, fatty acid esters, natural and synthetic waxes, halogenated hydrocarbons, silicone oils, adhesives, aroma chemicals, scents, active substances, dyes, color formers, pigments and crosslinkers.

The weight ratio of hollow microsphere interior to hollow microsphere wall, i.e., the core/wall ratio, is generally in the range from 50:50 to 95:5, preferably in the range from 70:30 to 95:5 and more preferably in the range from 75:25 to 93:7.

The melamine-formaldehyde foams obtained according to the present invention generally have a density in the range from 3 to 100 g/l and more preferably have a density in the range from 5 to 50 g/l.

The present invention melamine-formaldehyde foams comprising hollow microspheres are obtainable batchwise or preferably continuously as sheets or webs in generally any desired thickness, advantageously in layer thicknesses ranging from 0.1 to 500 cm, preferably from 0.5 to 200 cm, more preferably from 1 to 100 cm, more particularly from 3 to 80 cm and most preferably from 5 to 50 cm. Moldings comprising melamine-formaldehyde foams according to the present invention are obtainable in a continuous manner and preferably in a batchwise manner.

The melamine-formaldehyde foams in the form of webs, sheets, moldings or some other form can be laminated or endowed with surface layers by generally customary methods on one, two, more or all sides, for example with paper, paperboard, glass overlay matt, wood, plasterboard, metal sheet or metal foil, plastic or self-supporting plastics foam/sheet, which may optionally also be foamed. The surface layers can be applied in the course of foaming or subsequently. In the case of subsequent application, it is advantageous to use an adhesion promoter.

When the melamine-formaldehyde foams of the present invention comprise hollow microspheres filled with active or effect substances to be released, this release can be effected at any desired time by applying a suitable mechanical or thermal action to the foam. For example, the above-described active or effect substances, for example surfactants, detergents or dyes, for example inks, scents or biocidally acting substances, can be released through thermal (e.g., hot air, various forms of radiation, for example infrared or microwave radiation) or mechanical destruction (pressing, rolling, ultrasound, etc) of the hollow microsphere walls. This releases the contents of the hollow microspheres uniformly or almost uniformly and causes wetting of the surface structure (struts and nodes) even in the interior of the open-cell melamine-formaldehyde foam structure. The processes for thermal or mechanical destruction of microcapsule walls are known in principle to a person skilled in the art, and are described in the literature. For example, the foam can be compression molded to destroy the microcapsule walls, as described in EP-A 0451535 for example, by leading the foam through a defined gap between two contra-rotating rolls in parallel alignment. In addition to leading the foam through a gap between two co-rotating rolls, it is also possible for the foam to be transported on a conveyor belt and for a roll—turning at the same circumferential speed as the speed of movement of the foam—to press down on the foam. The pressure on the foam can further be exerted by placing the foam for example into a press in which a ram presses down on the foam. In this case, however, continuous pressing is not possible.

It will be appreciated that the hollow microspheres may also contain active or effect substances whose action/effect develops even without destruction of the microcapsule walls; for instance, fire-retarding substances only become active in the event of a fire, and can develop their action/effect even in an encapsulated form.

The melamine-formaldehyde foams of the present invention are used for acoustical and/or thermal insulation in buildings, vehicle, railroad, ship and aircraft construction and also in space travel and as a cushioning material for the padding of seating areas.

The melamine-formaldehyde foams of the present invention exhibit more particularly even at high loadings, i.e., hollow microsphere contents and optionally associated active and effect substance contents, good mechanical properties for the foam and better fixing of the hollow microspheres in the foam. Furthermore, the hollow microspheres can be incorporated in the foam in the course of foam production without additional process step.

The examples which follow illustrate the invention.

EXAMPLES

Methods of Measurement:
Mechanical Properties, Elasticity:

Ram pressure measurements for evaluating the mechanical quality of the melamine resin foams were all carried out as described in U.S. Pat. No. 4,666,948. A cylindrical ram having a diameter of 8 mm and a height of 10 cm was pressed into a cylindrical sample having a diameter of 11 cm and a height of 5 cm in the direction of foaming at an angle of 90° until the sample tore. The tearing force [N], hereinafter also referred to as ram pressure value, provides information as to the quality of the foam.

Comparative Example V-1

Producing a Melamine-Formaldehyde Foam Without Hollow Microspheres (According to WO-A-2009/021963)

75 parts by weight of a spray-dried melamine-formaldehyde precondensate (molar ratio 1:3) were dissolved in 25 parts by weight of water, then 3% by weight of formic acid, 2% by weight of a sodium $C_{12}/C_{14}$-alkyl sulfate, 38% by weight of pentane, all % by weight being based on the weight of the precondensate, were added, this was followed by stirring and then foaming in a polypropylene mold (for foaming) by irradiation with microwave energy. After foaming, the foam was dried for 30 minutes.

This melamine-formaldehyde foam had a density of 7.5 g/l and a ram pressure value of 18.9 N.

Inventive Example 4 and Comparative Examples V-2, V-3 and V-5

In each case, 75 parts by weight of a spray-dried melamine-formaldehyde precondensate (molar ratio melamine:formaldehyde 1:3) were dissolved in 25 parts by weight of water. This mixture was admixed with 3 parts by weight of formic acid, 2 parts by weight of a fatty alcohol polyglycol ether as surfactant, 38 parts by weight of pentane and 10% by weight (based on the total weight of the melamine-formaldehyde precondensate) of hollow glass microspheres based on soda-lime silicate glass having the mean particle diameters ($D_{50}$, volume averaged, Malvern, Fraunhofer diffraction) and bulk densities mentioned in table 1. This mixture was vigorously stirred and then foamed in a polypropylene foaming mold by irradiation with microwave energy at 2.54 GHz. The foams formed in each case were subsequently dried with hot air.

The properties of the melamine-formaldehyde foams obtained in each case are reported in table 1.

TABLE 1 amount and size of hollow microspheres and properties of melamine-formaldehyde foams

| Example | V-1 | V-2 | V-3 | 4 | V-5 |
|---|---|---|---|---|---|
| Hollow microsphere, amount [% by weight] | — | 10 | 10 | 10 | 10 |
| Hollow microsphere, median particle diameter ($D_{50}$, volume averaged, Malvern, Fraunhofer diffraction) [μm] | — | 50 | 190 | 360 | 650 |
| Bulk density [g/l] | — | 32 | 26 | 20 | 16 |
| Properties | | | | | |
| Density [g/l] | 7.5 | 7.5 | 7.9 | 7.5 | 6.9 |
| Ram pressure [N] | 18.9 | 11.2 | 14.6 | 18.5 | 15.1 |

We claim:

1. A melamine-formaldehyde foam comprising hollow microspheres, wherein said hollow microspheres have a median particle diameter ($D_{50}$, volume averaged, Malvern, Fraunhofer diffraction) in the range from 260 μm to 490 μm, wherein the melamine-formaldehyde foam has an open-cell foam scaffold comprising a multiplicity of interconnected, three-dimensionally branched struts and open cell-pores.

2. The melamine-formaldehyde foam according to claim 1, wherein the hollow microsphere content is in the range from 0.1% to 60% by weight, wherein the percentages by weight are based on the total weight of hollow microspheres and melamine-formaldehyde precondensate used for foam production.

3. The melamine-formaldehyde foam according to claim 1, wherein the hollow microspheres are embedded into the open-cell pores.

4. The melamine-formaldehyde foam according to claim 1, wherein the hollow microsphere walls comprise a polymer or an inorganic material.

5. The melamine-formaldehyde foam according to claim 1, wherein the hollow microsphere walls comprise glass.

6. The melamine-formaldehyde foam according to claim 1, wherein the hollow microsphere interiors are at least partly filled with a substance which is released by destruction of the hollow microsphere walls to develop its specific activity for a particular desired use.

7. The melamine-formaldehyde foam according to claim 2, wherein the hollow microspheres are embedded into the open-cell pores.

8. The melamine-formaldehyde foam according to claim 7, wherein the hollow microsphere walls consist of a polymer or of an inorganic material.

9. The melamine-formaldehyde foam according to claim 7, wherein the hollow microsphere walls comprise glass.

10. The melamine-formaldehyde foam according to claim 9, wherein the hollow microsphere interiors are at least partly filled with a substance which is released by destruction of the hollow microsphere walls to develop its specific activity for a particular desired use.

11. A process for producing the melamine-formaldehyde foam comprising hollow microspheres according to claim 1 wherein the consecutive process steps a) and b) are carried out:
   a) heating to foam up and crosslink a mixture comprising a melamine-formaldehyde precondensate having a molar ratio of melamine:formaldehyde in the range from 1:1.3 to 1:5, hollow microspheres having a median particle diameter ($D_{50}$, volume averaged, Malvern, Fraunhofer diffraction) in the range from 260 µm to 490 µm, curatives, dispersants and blowing agents, and
   b) drying the foam obtained in process step a).

12. A cushioning which comprises the melamine-formaldehyde foam comprising hollow microspheres according to claim 1.

\* \* \* \* \*